(12) United States Patent
Bauman

(10) Patent No.: US 7,344,172 B1
(45) Date of Patent: Mar. 18, 2008

(54) SPRING-LOADED CASE HOOK

(76) Inventor: Jerome Bauman, 978 40th St. SE., Buffalo, MN (US) 55313

( * ) Notice: Subject to any disclaimer, the term of this patent is extended or adjusted under 35 U.S.C. 154(b) by 0 days.

(21) Appl. No.: 11/508,691

(22) Filed: Aug. 23, 2006

(51) Int. Cl.
  *B65G 7/12* (2006.01)
(52) U.S. Cl. .......................................... 294/26; 294/19.1
(58) Field of Classification Search ................. 294/15, 294/17, 19.1, 19.3, 26
  See application file for complete search history.

(56) References Cited

U.S. PATENT DOCUMENTS

| | | | | |
|---|---|---|---|---|
| 1,623,497 A | * | 4/1927 | Rurup | 56/340.1 |
| 2,542,665 A | * | 2/1951 | Gustafson | 56/340.1 |
| 2,586,245 A | * | 2/1952 | McRae | 177/131 |
| 3,863,377 A | * | 2/1975 | Leonard | 43/6 |
| 4,601,505 A | * | 7/1986 | Chilton | 294/26 |
| D311,482 S | * | 10/1990 | Morton | D8/51 |
| 5,171,052 A | | 12/1992 | Cunningham | 294/19.1 |
| 5,351,365 A | * | 10/1994 | Hauck | 16/422 |
| D385,076 S | * | 10/1997 | Milbury | D34/10 |
| 6,591,986 B2 | | 7/2003 | Soehnlen et al. | 206/434 |
| 7,159,260 B2 | * | 1/2007 | Hansen | 7/143 |

* cited by examiner

*Primary Examiner*—Dean J Kramer
(74) *Attorney, Agent, or Firm*—Vidas, Arrett & Steinkraus, P.A.

(57) ABSTRACT

A spring-spring loaded case hook including a handle, a spring casing engaged to the handle, the spring casing having a hook end and a handle end, a hook having a shaft, a portion of the shaft being disposed in the spring casing, a stop engaged to the hook, the stop being constructed and arranged for positioning in the spring casing, the stop and the portion of the shaft being constructed and arranged for slidable positioning within the spring casing and at least one first spring disposed in the spring casing, the spring disposed about a portion of the shaft within the spring casing, the spring comprising a first end and a second end, the first end being proximate to the stop and the second end being proximate to the hook end of the spring casing.

20 Claims, 6 Drawing Sheets

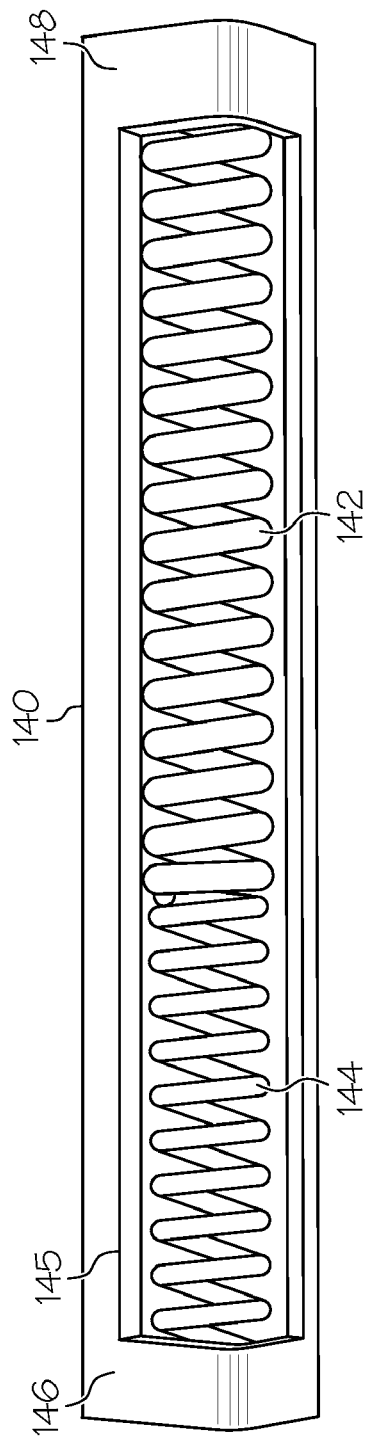
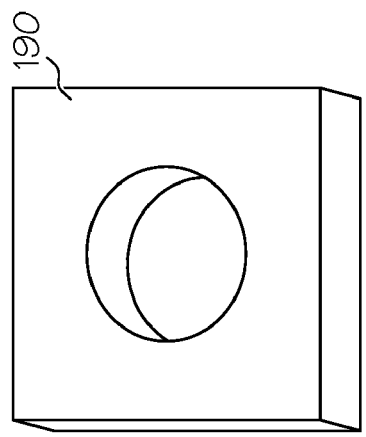
FIG. 6
FIG. 7

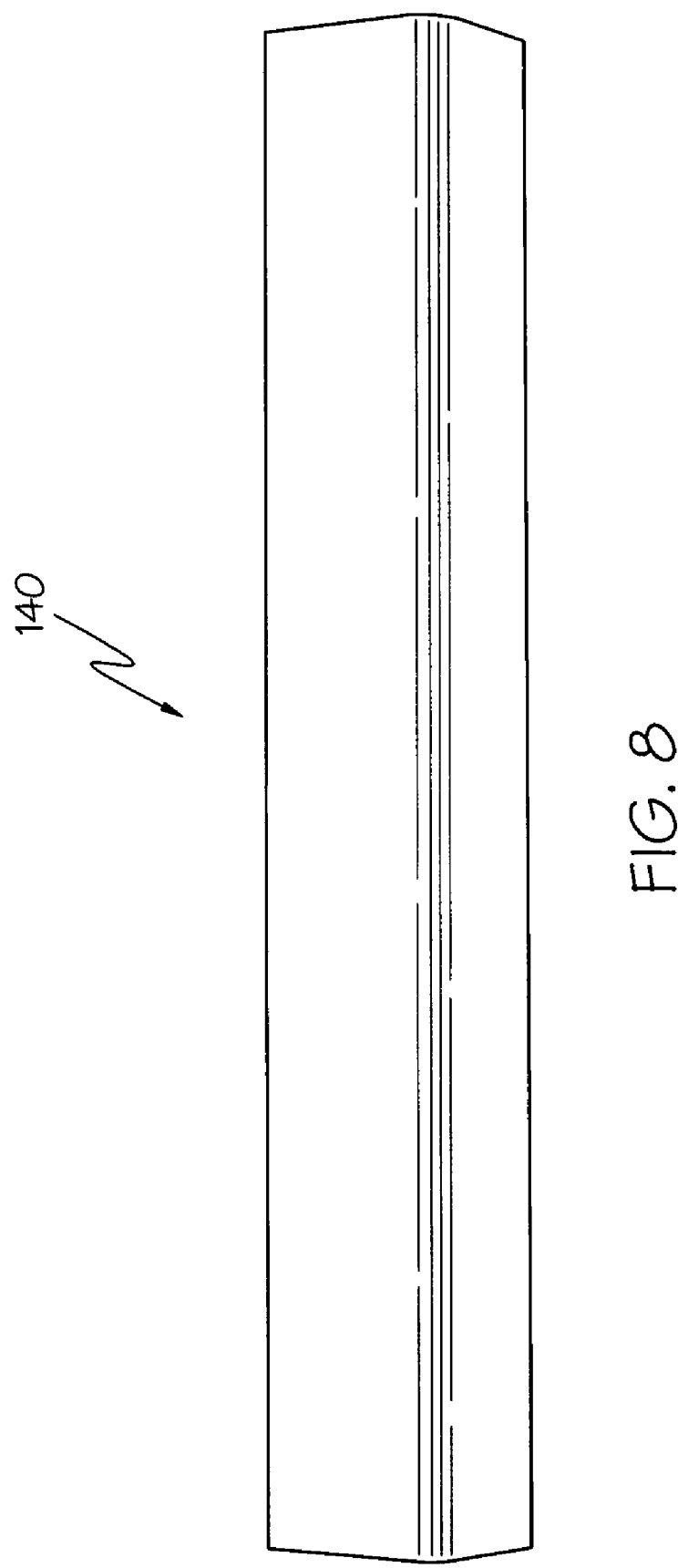

SPRING-LOADED CASE HOOK

FIELD OF THE INVENTION

The present invention relates to a device for manually moving stacked cases which are used for shipping and distribution of food and beverage products.

BACKGROUND OF THE INVENTION

In the field of art relating to the shipping and storage of bulk food products including milk, soft drinks, fruit punch, natural juices such as orange juice, alcoholic beverages such as beer, and other beverages, cases are filled with the containers or bottles, and stacked on pallets in vertical stacks of four to eight cases, for transport and distribution. Cases may be stacked on pallets in several different configurations based on the pallet footprint. Typical pallets will be stacked from four to six cases high depending on the pallet size. Each case may contain, for example, four gallon size containers, 9 half gallon containers, 16 quart size containers, or 96 pint size containers, and each case can weigh as much as 50 or 60 pounds when full. See U.S. Pat. No. 6,591,986, for example.

Pallets that support stackable cases are the most widespread form of shipping product for the retail or food service industry and the cases are the only returnable, reusable shipping mechanism considered by the industry.

The popular concept of a method of moving stacked loads in a warehouse involves the engagement of the pallet by fork lifts to lift the load and move it to any desired location without the application of any manual effort. Unfortunately, there are many warehousing operations, such as in soft drink, milk, and beer bottling plants, supermarkets, and the like, where there is insufficient room to permit movement of the loads by a lift truck or a two-wheeled dolly, hence such stacked loads must often be manually shifted when movement is desired.

Moving these stacks manually imposes a substantial strain on the back and arm muscles, and can result in debilitating injuries to the workers Because it is not possible to shift the load by pushing because the stacks may topple, it is therefore necessary to manually grasp a lower portion of the load while supporting the top, and apply a pulling force to effect the movement of the stacked load. Manually moving these stacks imposes substantial straining of the back, shoulder and arm muscles of the workers, and can result in debilitating injuries.

Tools, such as the telescopically extending tool shown in FIG. 1, is disclosed in U.S. Pat. No. 5,171,052, have been proposed for use in engaging the lower portion of the stack while supporting the upper stack by hand, in order to prevent the need for bending and twisting of the back muscles, and thus minimize the opportunity for causing a sprained back.

However, such tools fail to have a means for absorbing shock when they are fully extended, or when met with resistance, such as from the loads catching, for example. Consequently, injuries to arms, shoulders and backs may still occur.

There remains a need in the art, however, for an improved tool which can be used for manually moving such stacked cases.

All published documents, including all U.S. patent documents, mentioned anywhere in this application are hereby expressly incorporated herein by reference in their entirety. Any copending patent applications, mentioned anywhere in this application are also hereby expressly incorporated herein by reference in their entirety.

SUMMARY OF THE INVENTION

The present invention relates to a device for assisting in the manual movement of a load which is engaged to a surface.

In one aspect, the present invention relates to spring loaded case hook for manually moving stacked cases.

In one embodiment, the spring-loaded case hook according to the invention includes a handle; a spring casing engaged to the handle, the spring casing having a hook end and a handle end; a hook having a shaft, a portion of the shaft being disposed in the spring casing; a stop engaged to the hook, the stop being constructed and arranged for positioning in the spring casing, the stop and the portion of the shaft being constructed and arranged for slidable positioning within the spring casing; and at least one first spring disposed in the spring casing, the spring disposed about a portion of the shaft, the spring comprising a first end and a second end, the first end being proximate to the stop and the second end being proximate to the hook end of the casing.

Suitably, the at least one spring is a progressive rate spring.

In one embodiment the spring-loaded case hook includes at least one first spring and at least one second spring. Suitably, both the first spring and the second spring are progressive rate springs, at least one of the springs having a compression which is different than the other.

These and other aspects of the invention are described in the following detailed description of the invention or in the claims.

BRIEF DESCRIPTION OF THE DRAWINGS

FIG. 6 is an exploded longitudinal cross-section of a spring casing having a first and second spring disposed therein.

FIG. 7 is a perspective view of one embodiment of a stop which may be employed in the spring-loaded case hook according to the invention.

FIG. 8 is a side perspective view of a spring casing which may be employed in the spring-loaded case hook according to the invention.

DETAILED DESCRIPTION OF THE INVENTION

While this invention may be embodied in many different forms, there are described in detail herein specific preferred embodiments of the invention. This description is an exemplification of the principles of the invention and is not intended to limit the invention to the particular embodiments illustrated.

Figure 1:
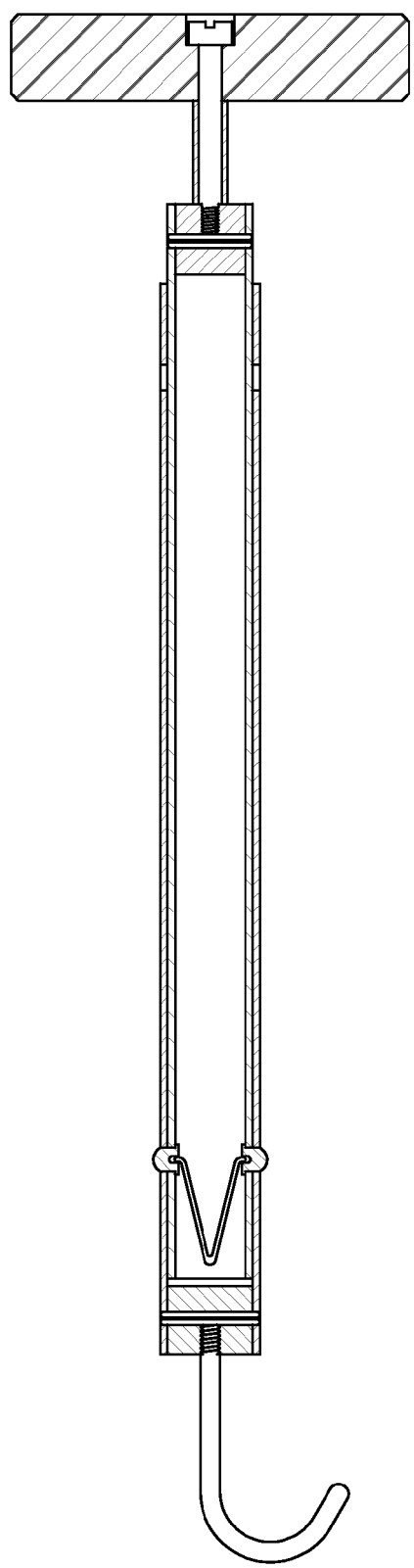
FIG. 1 is a prior art device.
Figure 2:
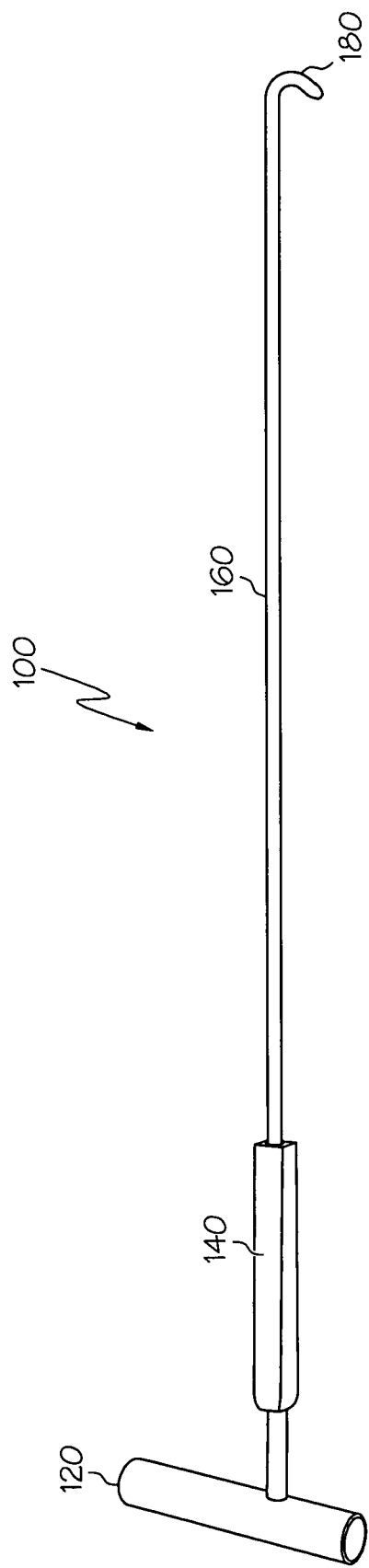
FIG. 2 is a side view of one embodiment of a spring-loaded case hook according to the invention.

Turning now to the figures, FIG. 2 is a side view of a spring-loaded case hook 100 according to the invention. A handle 120 which is cylindrical in form, is shown engaged to a spring casing 140. A shaft 160 having a hook 180 is slidably engaged within the spring casing 140. In this embodiment, shaft 160 is shown having a rod size of 5/16". However, this may be varied and rod sizes of about 3/8" up to about 1/2" may be employed herein.

The overall length of the spring-loaded case hook 100 is from about 25" (about 63.5 cm) to about 35" (about 90 cm). These devices can be ergonomically fitted to a user's hand size, height and arm length, for example.

Figure 3:
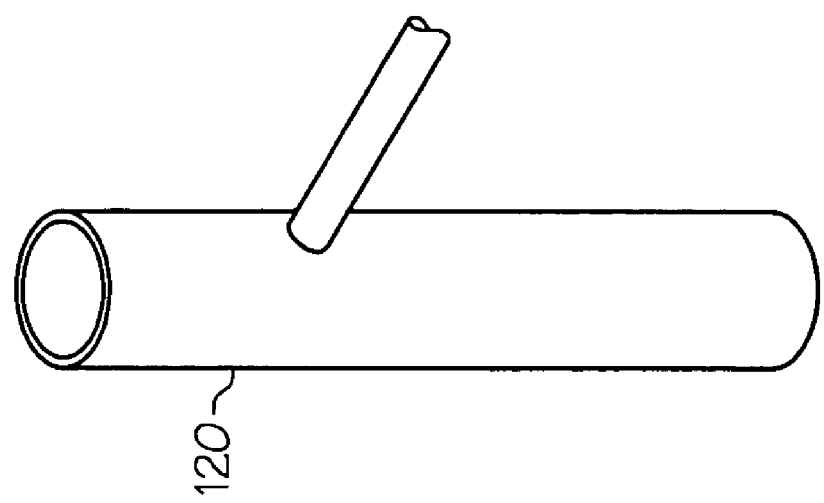
FIG. 3 is a side view of one embodiment of a handle which may be used in accordance with the spring-loaded case hook according to the invention.

FIG. 3 is a side view of a handle 120, cylindrical in form, and having a diameter of about 3/4 inches. FIG. 3 is a side view of a handle 120, cylindrical in form, and having a diameter of about 1/4 inches. Handle size may be varied between about 3/4 and 2", although this range may be varied depending on hand size.

Figure 4:
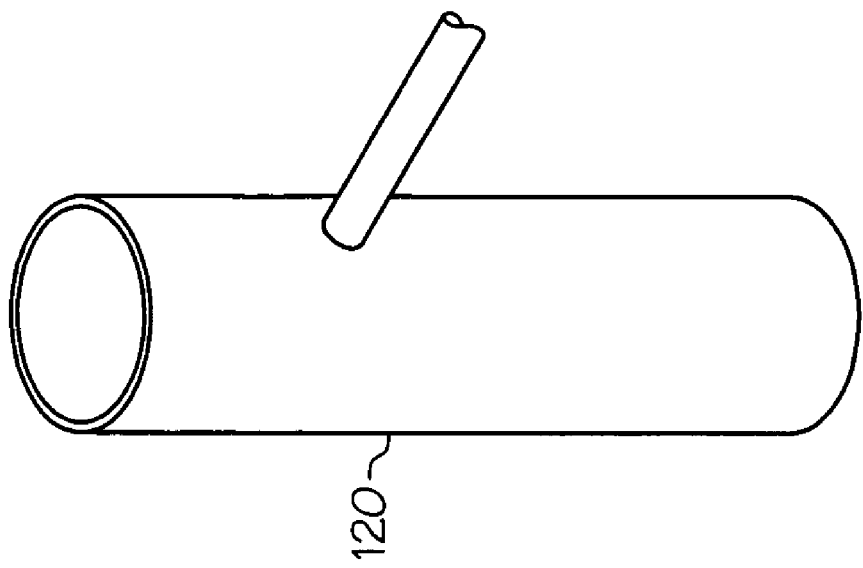
FIG. 4 is a side view of another embodiment of a handle which may be used in accordance with the spring-loaded case hook according to the invention.

FIG. 4 is a side view of a spring-loaded case hook 100 according to the invention with the spring casing 140 shown as a longitudinal cross-section. Casing 140 houses a first spring 142 and a second spring 144. While the invention contemplates the use of other types of springs, in this embodiment, first spring 142 is a progressive rate spring and second spring 144 is a progressive rate spring.

A progressive rate spring may be defined as a spring having an increasing spring constant. For example, if the first inch of spring motion requires X pounds of force, the second inch would require more than an additional X pounds, and the third inch would require still more. Progressive-rate springs become stiffer as they are compressed, unlike single-rate springs, which have a fixed spring rate, k (F=kX; where f is the force in lbs, k is the spring constant and X is the deflection). Progressive springs have a progressive spring rate that changes with changing spring load, i.e. typically the spring rate rises as the spring load is increased. A progressive spring is designed so that more and more coils touch as the load progressively increases, and the spring constant progressively increases with the shortening of the overall length of the spring. For example, 15 lb to 25 lb progressive rate spring will take 15 lbs to compress it the first inch, and an additional 25 lbs to compress it the last inch of deflection. The benefit is that the spring is soft at the start and becomes progressively stiffer towards the end of its compression to absorb larger forces.

One advantage of employing a progressive force spring is that the spring can effectively perform over a wider range of applied force. Therefore, embodiments that employ at least one progressive force spring(s) can be used more effectively over a wider range of container weights than a device employing a linear spring, for example. Spring rate, usually expressed in lbs/in, is the force required to compress a linear spring by one unit, typically expressed as one inch. Thus, in some embodiments, the progressive rate spring or springs employed have a spring rate that rises as the amount of deflection increases.

Figure 5:
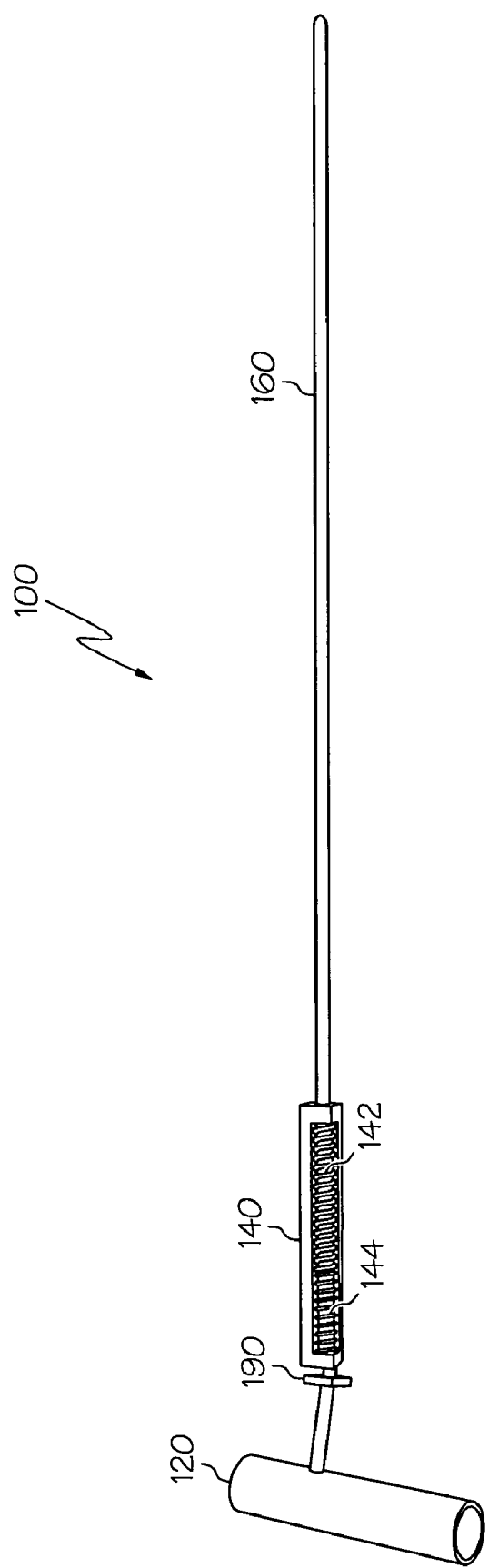
FIG. 5 is a side view of one embodiment of a spring-loaded case hook according to the invention showing the spring casing as a longitudinal cross-section.

In the embodiment shown in FIG. 5, a first spring 142 is employed which is a progressive rate spring and has a higher progressive rate than the second spring 144 which is also a progressive rate spring. The use of two such springs having different spring rate ranges allows the springs to be useful over a wider load range. For example, empty stacks of cases will require a lower progressive rate spring than a stacks of cases which are full and weigh the maximum. Also shown in FIG. 5 is a square nut 190 which may be welded to the handle 120 and to the spring casing 140 for facilitating both attachment and alignment of handle 120 with the spring casing 140.

In one specific embodiment, a first progressive rate spring 142 having a load of about 65 pounds to about 140 pounds at 15% deflection is used in combination with a second spring having a load of about 45 to about 85 pounds at 25% deflection.

One specific example of a progressive rate spring is a chrome silicon steel die spring having a spring rate of about 64.8 to about 140 pounds at 15% deflection available from McMaster Carr in Chicago, Ill. Another specific example of a progressive rate spring is a chrome silicon steel die spring having a progressive spring rate of about 44 to about 85 pounds at 25% deflection also available from McMaster Carr in Chicago, Ill. Such springs are available from other distributors as well.

In the embodiment shown in FIG. 5, first and second springs 142, 144, each have a 5/8" outside diameter and a 11/32" inside diameter. First spring 142 is approximately 3" in length and the wire size is 0.093×0.125, and second spring 144 is approximately 2" in length and the wire size is 0.069×0.109. For an embodiment as disclosed in FIG. 5 wherein the springs 142, 144 are disposed about shaft 160, the size of the spring may suitably be varied depending on the shaft size. Furthermore, size of spring casing 140, may also be varied depending on shaft and spring(s) sizes. In this embodiment, the ends of each spring are closed and ground.

The present invention is not limited by the number of springs employed. Optionally, one spring may be employed which has a wider spring rate range. It is also envisioned, that three, four or more springs may suitably be employed.

While the embodiment depicted in FIG. 5 comprises springs that absorb loading in compression, other embodiments are envisioned that can have one or more springs arranged to absorb the loading in tension, i.e. while stretching the spring.

The springs employed herein may be formed of any suitable spring material. Examples of spring materials include, but are not limited to, steel, carbon steel, alloy steel, stainless steel, case-hardened steel, chrome-silicon steel, cold-rolled steel, hard-drawn steel and galvanized hard-drawn steel, spring-tempered steel, zinc-plated spring-tempered steel, etc. Springs can be formed of other materials such as brass or phosphor bronze, but these springs may be less economically desirable.

In some embodiments, at least one chrome silicon steel spring is employed, and suitably two chrome silicon steel springs having different spring rates, are employed.

FIG. 6 is an exploded longitudinal cross-section of spring casing 140 shown in FIG. 5 having first spring 142 and second spring 144 disposed within casing 140, and which may be disposed about shaft 160 (not shown), of spring-loaded case hook 100. Suitably, the shaft, not shown, may be slidably engaged within casing 140. A stop (also not shown) may also be disposed within the spring casing 140 at the handle end 146 of casing 140.

A second square nut 190, is shown in perspective in FIG. 7. This square nut may be welded to the shaft 160 at the end of the shaft closest to the handle portion. This nut 190 acts to compress the springs 142, 144 as well as for stop for the shaft 160 when the spring-loaded case hook 100 is in use. A third square nut (not shown) of the same type may be disposed about the shaft 160 and retained within the spring casing 140 at the hook end. The shaft 160 is slidably engaged with this third square nut. This nut further acts to compress the springs.

One embodiment of a stop 190 is shown as a perspective view in FIG. 7. In this embodiment stop 190 is either a ⅜" or a ⁵⁄₁₆" stainless steel square nut which is non-rotatably mounted on the end of shaft 160 which is not shown.

Stainless steel is typically available with various amounts of chromium and nickel. The addition of chromium can increase the strength of stainless steel. Typically, the nuts will have either 16 or 18% by weight chromium. Nickel may be in the range of 8 or 10% by weight.

FIG. 8 is an exploded side view of the spring casing 140 which houses a portion of the shaft, spring(s) and stop. In this embodiment, spring casing 140 is shown having a rectangular configuration. This configuration is advantageously employed to keep shaft 160 in line with handle 120. Spring casing for the embodiment shown in FIG. 5, above, wherein the total spring length is about 5", is suitably about 5¾" long to accommodate the springs and the stop. Again, the length of the spring casing can be varied depending on the length of the spring or springs employed.

The device disclosed herein may find utility for manually moving bulk food products which are otherwise not reachable by fork lift or other mechanical means, the products of which are stored and shipped in cases, the cases typically stacked on pallets in vertical stacks of four to eight cases. These bulk food products include, for example, but are not limited to, milk, soft drinks, fruit punch, natural juices such as orange juice, alcoholic beverages such as beer, and other beverages. It is envisioned that the device disclosed herein, may be used for other purposes as well.

The above disclosure is intended to be illustrative and not exhaustive. This description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

The invention claimed is:

1. A spring-loaded case hook, the spring-loaded case hook comprising:
   a handle;
   a spring casing engaged to said handle, said spring casing having a hook end and a handle end;
   a hook having a shaft, a portion of said shaft being disposed in said spring casing;
   a stop engaged to said hook, said stop being constructed and arranged for positioning in said spring casing, said stop and said portion of said shaft being constructed and arranged for slidable positioning within said spring casing;
   at least one first spring disposed in said spring casing, said spring disposed about a portion of said shaft, said spring comprising a first end and a second end, said first end being proximate to said stop; and
   at least one second spring disposed in said spring casing, said at least one second spring disposed about a portion of the shaft, and wherein the second spring has a first end and a second end, the first end of the second spring engaged by the second end of the first spring.

2. The spring-loaded case hook of claim 1 wherein said at least one first spring is a progressive spring.

3. The spring-loaded case hook of claim 2 wherein said at least one first spring has a spring rate which increases with increasing deflection.

4. The spring-loaded case hook of claim 2 wherein said at least one first spring has a progressive spring rate of about 40 to about 150 pounds at 15% deflection.

5. The spring-loaded case hook of claim 2 wherein said at least one first spring has a progressive spring rate of about 60 to about 140 pounds at 15% deflection.

6. The spring-loaded case hook of claim 2 wherein said at least one second spring is a progressive rate spring.

7. The spring-loaded case hook of claim 6 wherein said at least one second spring has a progressive spring rate of about 30 to about 100 pounds at 25% deflection.

8. The spring-loaded case hook of claim 6 wherein said at least one second spring has a progressive spring rate of about 40 pounds to about 90 pounds at 25% deflection.

9. The spring-loaded case hook of claim 6 wherein said at least one second spring has a progressive spring rate that is less than that of said at least one first spring.

10. The spring-loaded case hook of claim 1 wherein said at least one first spring is chrome silicon steel.

11. The spring-loaded case hook of claim 1 the first end of said first spring being engaged by said stop.

12. The spring-loaded case hook of claim 1, the second end of the second spring being engaged by the inner surface of the casing at the hook end of the casing.

13. The spring-loaded case hook of claim 1 wherein said handle is non-rotatable relative to said casing.

14. The spring-loaded case hook of claim 1 wherein said casing has an inner surface and an outer surface and said outer surface of said casing is rectangular.

15. The spring-loaded case hook of claim 14, said shaft of said hook having a first end and a second end, the first end proximate the handle of the spring-loaded case hook and a bolt is non-rotatably engaged to said first end of said shaft.

16. The spring-loaded case hook of claim 1, said spring-loaded case hook has an overall length of about 25" (63.5 cm) to about 35" (about 90 cm).

17. The spring-loaded case hook of claim 1 wherein said handle has a gripping portion which is cylindrical and has a diameter of about ¾" to about 1½".

18. The spring-loaded case hook of claim 1 wherein said stop is a nut.

19. A spring-loaded case hook, the spring-loaded case hook comprising:
   a handle;
   a rectangular spring casing engaged to said handle, said spring casing having an inner surface and an outer surface, and a hook end and a handle end and said spring casing is non-rotatable relative to said handle;
   a hook having a shaft, a portion of said shaft being disposed in said spring casing;
   a stop engaged to said hook, said stop being constructed and arranged for positioning in said spring casing, said stop and said portion of said shaft being constructed and arranged for slidable positioning within said spring casing; and
   at least one first progressive spring disposed in said spring casing and at least one second progressive spring disposed in said spring casing, said at least one first spring is disposed about a portion of said shaft and said at least one second spring is disposed contiguously with said at least one first spring about a portion of said shaft, said at least one first spring comprising a first end and a second end and said at least one second spring comprising a first end and a second end, said first end of said at least one first spring being proximate to said stop and said second end of at least one second spring being proximate said hook end of said casing.

20. The spring-loaded case hook of claim 19 wherein said at least one first progressive spring has a compression which is either less than or greater than said at least one second progressive spring.

* * * * *